United States Patent [19]

Nafisi-Movaghar

[11] Patent Number: 5,000,972
[45] Date of Patent: Mar. 19, 1991

[54] METHOD OF MAKING DRIED FRUITS

[75] Inventor: Karim Nafisi-Movaghar, Walnut Creek, Calif.

[73] Assignee: Del Monte Corporation, San Francisco, Calif.

[21] Appl. No.: 369,149

[22] Filed: Jun. 21, 1989

[51] Int. Cl.$^5$ .............................................. A23L 1/212
[52] U.S. Cl. .................................. 426/333; 426/102; 426/335; 426/486; 426/639; 426/640
[58] Field of Search ............... 426/640, 639, 102, 445, 426/447, 615, 616, 486, 333, 335

[56] References Cited

U.S. PATENT DOCUMENTS

| | | |
|---|---|---|
| 1,543,948 | 6/1925 | Moore . |
| 1,835,237 | 12/1931 | Moore ................................ 426/486 |
| 1,842,720 | 1/1932 | Harris . |
| 2,023,536 | 12/1935 | Moore ..................................... 99/5 |
| 2,091,372 | 8/1937 | Moore ................................ 426/447 |

(List continued on next page.)

FOREIGN PATENT DOCUMENTS

| | | |
|---|---|---|
| 197809 | 9/1978 | Fed. Rep. of Germany . |
| 2712560 | 9/1978 | Fed. Rep. of Germany . |
| 36373 | 3/1983 | Japan . |
| 59-6834 | 1/1984 | Japan . |
| 59-6836 | 1/1984 | Japan . |
| 60-232049 | 10/1985 | Japan . |
| 1056048 | 3/1986 | Japan . |
| 61288317 | 6/1988 | Japan . |

OTHER PUBLICATIONS

Peterson, 1978 Encyclopedia of Food Science, AVI Publishing Co., Inc., Westport, Conn., pp. 713-714.
H. I. Sinnamon, "Effect of Prior Freezing on Dehydration of Apple Half Segments", Food Technology, vol. 22, 1033, Aug. 1968, pp. 101, 102 and 103.
"Introduction to the Biochemistry of Foods" by J. B. S. Braverman, Elsever Publishing Company, NW 1963 on pp. 208 and 209.

Food Technology, "Efficacy of Added Ascorbic Acid in the Control of Discoloration of Kraut", A. Setky et al., pp. 67, 68, 69, 70.
Food Technology, Oct. 1954, "Factors Affecting the Color Stability of Frozen Montmorency Cherries", Stein et al., pp. 445-447.
Food Engineering, Dec. 1952, "Better Color, Better Flavor in Processed Mushrooms by Adding Ascorbic Acid", Baurenfeind et al., pp. 89-92.
"Prevention of Darkening of Bananas During Dehydration", J. Feigenbaum et al., p. 3628, vol. 44.
Food Product Development by A. O. Olorunda, May 1977, Controlling Storage and Processing Conditions, p. 324.
"Browning of Frozen Apples Prevented", by Katherine G. Knight, Food Industries, Dec. 1949, pp. 63-65.
"Ascorbic Acid and Meat Color", Food Technology, May 1952, Betty M. Watts, pp. 194-196.
Food Dehydration, vol. II, Products and Technology, 1964.
Freeze-Drying of Foods by C. Judson King, Sep. 1970.

Primary Examiner—Carolyn Paden

[57] ABSTRACT

It has been found that dried fruits can be prepared without resorting to sulfiting the fruits in order to prevent the discoloration of the fruit and to prevent microbiological deterioration of the fruit. It has been found that through the utilization of a combination of vacuum and particular infusion soaking solution containing a sugar having more than six carbon atoms, an acid, a microbiological agent and optionally a chelating agent that utilizing a particular sequence of treating steps, a dried fruit that is not discolored and which has good taste can be prepared and can undergo long term storage. That is, the packaged product will have a reasonably long shelf life and taste and appearance.

18 Claims, 3 Drawing Sheets

U.S. PATENT DOCUMENTS

| | | | |
|---|---|---|---|
| 2,110,184 | 3/1938 | Webb | 426/447 |
| 2,283,302 | 5/1942 | Webb | 99/194 |
| 2,473,184 | 6/1949 | Webb | 99/204 |
| 2,587,939 | 3/1952 | Webb | 99/239 |
| 2,712,698 | 1/1955 | Webb | 34/9 |
| 2,767,556 | 10/1956 | Robinson et al. | 62/6 |
| 2,848,333 | 8/1958 | Fisher | 99/102 |
| 2,865,758 | 12/1958 | Weckel | 99/102 |
| 2,895,836 | 7/1959 | Lazar | 99/204 |
| 2,901,359 | 8/1959 | Forkner | 99/204 |
| 3,025,169 | 3/1962 | Guadagni . | |
| 3,043,699 | 7/1962 | Schmalz | 99/85 |
| 3,305,366 | 2/1967 | Sutton | 99/154 |
| 3,365,309 | 1/1968 | Pader | 99/204 |
| 3,692,546 | 9/1972 | Dolev | 426/333 |
| 3,754,938 | 8/1973 | Ponting | 99/154 |
| 3,806,610 | 4/1974 | Rahman | 426/335 |
| 3,814,821 | 6/1974 | Oliver et al. | 426/265 |
| 3,843,810 | 10/1974 | Fehmerling | 426/615 |
| 3,894,157 | 7/1975 | Gottleb | 426/268 |
| 3,962,355 | 6/1976 | Yamazaki | 426/640 |
| 3,987,208 | 10/1976 | Rahman | 426/326 |
| 4,011,348 | 3/1977 | Farrier | 426/268 |
| 4,055,675 | 10/1977 | Popper | 426/640 |
| 4,110,478 | 8/1978 | Ooraikul | 426/262 |
| 4,350,711 | 9/1982 | Kahn | 426/102 |
| 4,355,050 | 10/1982 | Butland | 426/640 |
| 4,418,083 | 11/1983 | McKinney | 426/640 |
| 4,504,505 | 3/1985 | Gaehring et al. | 426/321 |
| 4,514,428 | 4/1985 | Glass | 426/321 |
| 4,542,033 | 9/1985 | Agarwala | 426/615 |
| 4,547,376 | 10/1985 | Silver et al. | 426/102 |
| 4,551,348 | 11/1985 | O'Mahony | 426/639 |
| 4,626,434 | 12/1986 | O'Mahony et al. | 426/50 |
| 4,650,686 | 3/1987 | Young et al. | 426/321 |
| 4,713,252 | 12/1987 | Ismail | 426/640 |
| 4,767,630 | 8/1988 | Silver | 426/102 |
| 4,775,545 | 10/1988 | Augustine | 426/639 |
| 4,778,681 | 10/1988 | Kuwabara | 426/241 |
| 4,814,190 | 3/1989 | Ismail | 426/640 |
| 4,844,931 | 7/1989 | Webb | 426/438 |

METHOD OF MAKING DRIED FRUITS

BACKGROUND OF THE INVENTION

The present invention is directed to a method of preparing dried fruits which method does not utilize sulfurous containing compounds as preservative agents. More particularly, the present invention is directed to a method of preparing dried fruits which does not utilize any sulfiting agents in order to prevent enzymatic and non-enzymatic browning and further to inhibit microbiological activity.

Dried fruits are a popular snack food item. Besides being very tasty, dried fruits contain many vitamins and minerals. Consequently, in comparison to many other snack foods, dried fruits provide a healthy alternative. However, one problem that has existed over the years with regard to dried fruits is that they have usually undergone a sulfiting treatment in order to control the enzymatic and non-enzymatic browning of the fruit and also to slow down or inhibit any microbiological activity in the fruit. There is no doubt that sulfiting is a very effective technique for the preservation of dried fruits. Sulfiting consists of treating the fruits with sulfur dioxide or with sulfurous acid salts. The sulfurous acid salts that are utilized are usually the alkali metal salts of the bisulfite ion and of the metabisulfite ion. The treatment can also be by directly utilizing sulfur dioxide.

Sulfiting acts to prevent non-enzymatic browning by inhibiting the Maillard reaction. In Maillard reaction browning there is a reaction between the reducing sugars in the fruit and the amino acids or amino compounds of the fruit. In this reaction, there is formed an intermediate Schiff base. This Schiff base intermediate then undergoes further reaction to ultimately form the brown pigment which is indicative of non-enzymatic browning. However, when the fruit has undergone sulfiting, the reducing sugars rather than undergoing reaction with the amino acids or amino compounds to produce the Schiff base, will undergo reaction with the sulfiting agent to produce an hydroxy sulfonate product. This sulfonate product intermediate will not further react to form the brown pigment that is indicative of non-enzymatic browning. Enzymatic browning also is inhibited by sulfiting agents in that the sulfiting agent will act as an inhibitor vis-a-vis the enzyme which causes the browning. The exact mechanism is not known but it is known that in the presence of the sulfiting agents the enzymes become deactivated. Further, sulfiting agents prevent the oxidative deterioration of the dried fruit. The reason for this is that the sulfiting agents are reducing agents. Since they are reducing agents the sulfiting agents can scavenge any dissolved oxygen and thereby prevent oxidative deterioration. The sulfiting agents are also effective in preventing the growth of microorganisms.

In addition to the above uses of sulfiting agents, sulfiting agents have also been found to be effective during the steeping of corn, in preventing potatoes from souring during potato starch manufacturing, in the bleaching of cherries for maraschino cherry production, to prevent the racemization and discoloration of corn syrup, to improve the color retention of garbanzo beans, to preserve the color of canned green beans, to lengthen the life of ripe tomatoes and to prevent the discoloration of coconut. These are only some of the beneficial usages of sulfiting agents. There is no denying that sulfiting agents have been very effective in the preservation of various food products. However, sulfiting agents do present some problems. There are a number of individuals that are sulfite sensitive. Some of these people are asthmatics. For some of these people the ingestion of a sulfiting agent can lead to a very serious reaction. In some cases this serious reaction can be life threatening. It is for this reason that there is a search for effective techniques for the preparation and the preservation of dried fruits without the need to use sulfiting agents. If an acceptable method of treating fruits during the drying process can be found which does not require the use of sulfiting agents, it is believed that many consumers will purchase such dried fruits in place of those which have undergone a sulfiting treatment.

Various techniques have been tried over the years to preserve dried fruits without having to use sulfiting agents. In U.S. Pat. No. 3,754,938 there is disclosed a technique for preserving apple slices using a solution consisting of ascorbic acid, calcium chloride and sodium bicarbonate. The sodium bicarbonate is added to maintain a pH of 7 to 9 during treatment. When this treating solution is used it is disclosed that a sulfiting treatment does not have to be used.

U.S. Pat. No. 3,894,157 discloses a method for stabilizing the color of freeze-dried carrots by treatment with ascorbic acid or erythorbic acid. These acids are noted to be anti-oxidants. An aqueous solution containing one of these acids is sprayed onto the carrots. When ascorbic acid is the acid, the ascorbic acid is in a concentration of about 1 to 3 percent of the solution. The treated carrots are then freeze-dried.

U.S. Pat. No. 4,011,348 discloses the treatment of raw fruits and vegetables with an aqueous solution having a pH between about 4 and 1.5 and containing a selective ascorbate ion concentration. The ascorbate ion is provided by sodium ascorbate and ascorbic acid. However, it is directed that ascorbic acid should not be used alone since it results in an excessively low pH.

U.S. Pat. No. 4,504,504 discloses a technique for preserving the texture of diced fresh foods through the use of gelled polyuronic acids. This is stated to be superior to the use of citric acid or calcium chloride in preserving dried fresh food products.

U.S. Pat. No. 4,650,686 discloses a method for reducing excessive browning in a baked good containing reducing sugars. This is accomplished by adding to the dough baking soda and fatty acid monoglyceride esters of polycarboxylic acids. The agents minimize reducing sugar browning during the baking process.

In U.S. Pat. No. 2,344,151 there is disclosed a method and apparatus for treating perishable food items such as lettuce and various fruits. The process consists of precooling the food item. During this stage the food items are usually packed in their shipping crates. The process is particularly described with regard to lettuce. After the precooling, a vacuum is rapidly drawn which removes air and other substances from the food product. A certain amount of water and moisture is also removed. When a predetermined temperature is reached, a protective substance is drawn into the chamber by at least partially drawing down the vacuum in the chamber. The protective substance can be an edible mineral oil or substances such as lithium chloride, or calcium chloride. These are the substances to preserve lettuce. Other substances could be used to preserve other vegetables and fruits.

In U.S. Pat. No. 2,134,924 there is disclosed a method for sterilizing various food items. The technique that is disclosed is to subject the food item to a reduced pressure in a vacuum chamber and then, when the food item is at a reduced pressure in the vacuum chamber, introducing the preservative chemical agent into the vacuum chamber. The various chemical agents that are introduced into the vacuum chamber are utilized to attack infectious organisms, their eggs, larvae, spores, bacteria and the like. The chemical agents that are utilized are introduced into the vacuum chamber in the gaseous state. The objective of this patent is to treat a fruit or other food item with a gaseous sterilant and not with any liquid substances.

The present process is directed to a multi-step process for producing a dried fruit which has an extended shelf life and which has not undergone a sulfiting treatment. That is, the present process is an effective alternative to the use of sulfiting agents in order to preserve fruits while they are being processed and dried and further, later, when they are packaged. Further, there is no deterioration in the flavor of the fruit. This is advantageous because there is now a technique for producing sulfite free dried fruits having a fresh fruit taste.

BRIEF DESCRIPTION OF THE INVENTION.

In the present invention a fruit is washed and is then prepared for processing. The preparation for processing consists of peeling the fruit where necessary, coring some fruits and depitting other fruits. Also a part of the preparation process is cutting and slicing the fruit to the proper size. For instance, peaches and apricots will be cut into halves while apples will be cut into slices. In the next step the prepared fruit is soaked in an aqueous infusion soak solution. The infusion soak solution will contain a carbohydrate having more than six carbon atoms such as sucrose, maltose or lactose, an edible acid so as to reduce the pH to below about 6, and preferably below about 5, and an anti-microbiological agent. Combinations of anti-microbiological agents can also be utilized. In addition, the infusion soak solution can also contain an edible chelating agent. The chelating agent can be ethylenediaminetetraacetic acid, citric acid, phosphoric acid and salts thereof. The fruit is heated in this solution to a temperature of about 60° F. to 220° F. for from about 0.5 to 60 minutes.

The next step is to deaerate the fruit. The fruit is deaerated by subjecting it to a vacuum. The fruit can be deaerated while it remains in the infusion soak solution. This is the preferred technique. In an alternative embodiment, the fruit can be removed from the infusion soak solution and deaerated after having been drained of the infusion soak solution. In the alternative embodiment the deaerating vacuum can be released either by the addition of a gas or a liquid. If a liquid is added it is preferably a heated liquid. This added liquid can contain flavorants such as sweeteners or other substances. Regardless of what technique is utilized for deaerating and for releasing the vacuum, the fruit is subject to a vacuum of about 1 inch to 30 inches of mercury for about 1 second to 2 hours. In the preferred technique as the fruit is being deaerated in the infusion solution the fruit is also being cooled to about 50° F. to about 150° F. while the fruit is maintained under the deaerating vacuum conditions in the infusion soak solution. After cooling the fruit is brought to atmospheric pressure by the addition of a gas and the infusion cooking solution in contact with the fruit is drained from the fruit. In the alternative embodiment the fruit will be cooled while undergoing vacuum deaeration. This will be the result of evaporative cooling. In the instance where the vacuum is released by the addition of a liquid, this liquid will then be drained from the fruit. The fruit, regardless of how processed to this point, then undergoes drying which can be an air drying, a drying under reduced oxygen conditions and/or a drying under reduced pressure. The objective is to reduce the moisture content of the dried fruits to about 1 to 70% by weight moisture, and preferably to a moisture level of about 10% to 40%, and most preferably to a moisture level of about 15% to 25% by weight. After drying, the fruit is packaged. The packaging is conducted under a vacuum, or under conditions whereby any air that is in contact with the fruit, or that would be in the package, is replaced with an inert gas such as nitrogen. After being packaged the dried fruits can be stored for an extended period of time.

In this process the infusion soak solution can be treated and recycled to the step of initial contact with the prepared fruit. In recycling the infusion soak solution it will typically undergo an enzyme treatment, a decolorizing treatment and will be fortified with additional infusion soak solution components so as to be at the desired strength of the infusion solution. The infusion solution can also be used as a flavorant in some other process or for some other product.

The net result is a process for producing the dried fruits wherein there is no need to utilize a sulfiting agent. There is only needed the use of the particular infusion solution in combination with the particular steps.

DETAILED DESCRIPTION OF THE INVENTION

Figure 1:
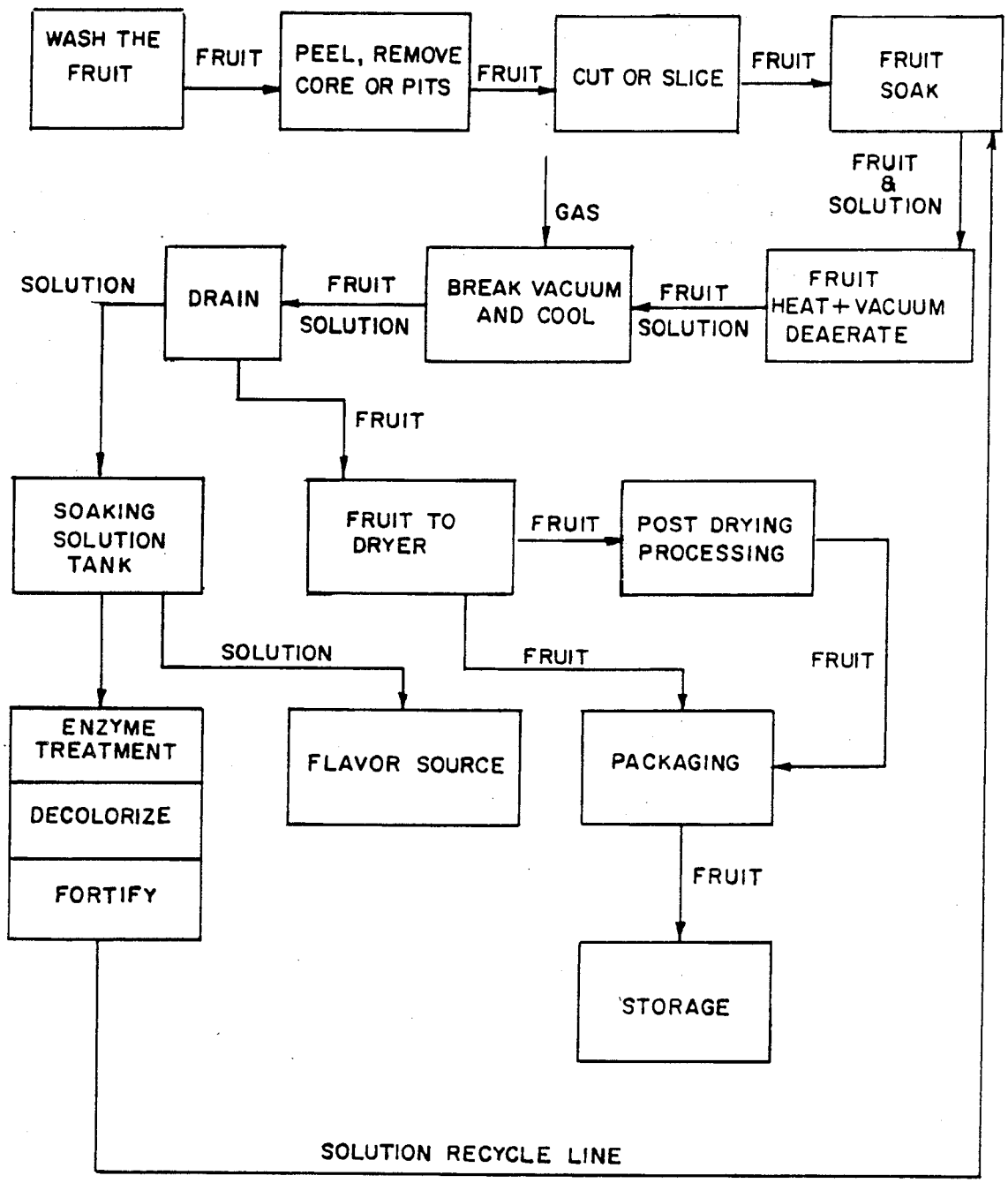
FIG. 1 is a schematic diagram of the process of the present invention wherein the fruit is deaerated while in contact with the infusion soak solution.

As has been noted above, the present invention is directed to processes for producing dried fruits without having to utilize any sulfiting agents. These dried fruits will also have an extended shelf life. The processes that can be utilized for producing the dried fruits are set forth in FIGS. 1-3. In FIG. 1 there is set forth the preferred technique for producing the dried fruits. The variation in the processes of these figures resides in the deaeration step and releasing the vacuum. Deaeration is conducted by subjecting the fruit to a vacuum. The deaeration can be conducted on the fruit while it is in the infusion soak solution or on the fruit after it has been drained of the infusion soak solution. If deaerated after draining the vacuum used to deaerate can be released by adding a gas or a liquid. In the latter instance, the infusion soak solution will be drained from the fruit, the fruit deaerated and then brought into contact with a further liquid. This further liquid can be a solution such as a sweetening solution, a flavoring solution or essentially any other type of solution. A suitable flavoring solution would contain fruit juices. This added liquid to release the vacuum can be recycled for reuse.

The drying step in each instance can be an air drying, a drying in a non-free oxygen containing atmosphere, or a vacuum drying. Free oxygen is non-chemically bound oxygen. After drying, the fruit will usually be packaged and then stored. In the packaging, any air within the package will be removed before it is sealed. Such air can be removed by drawing a vacuum on the package or by means of the air in the package being displaced with a non-free oxygen containing gas, or by placing an oxygen scavenger such as iron powder, activated carbon, ferrous carbonate or combinations of any of these materials into the package. Optionally, prior to packaging the fruit can undergo one or more post drying processing steps. Such steps could be the addition of a solid sweetener, the addition of a flavorant, a mixing with non-fruit items such as nuts, grains or the like, or a protective coating.

The aqueous infusion soak solution will contain a carbohydrate having six or more carbon atoms. Carbohydrates having twelve carbon atoms are preferred. Suitable carbohydrates are sucrose, maltose and lactose. The aqueous infusion soak solution will also contain an edible acid such as citric acid, malic acid, fumaric acid, phosphoric acid, ascorbic acid, erythorbic acid and the salts of these acids. The acid is used to adjust the pH of the solution to less than about 6, preferably to less than about 5, and most preferably to less than about 4.5. This aqueous infusion solution will also contain a an antimicrobiological agent. Suitable anti-microbiological agents are benzoic acid, sorbic acid, propionic acid and the homologs and salts of these acids. Combinations of these various components can also be used. In addition the infusion soak solution can also contain an edible chelating agent. Suitable chelating agents include ethylenediaminetetraacetic acid, citric acid, and phosphates such as pyrophosphates, polyphosphates, phosphoric acid and salts of these substances. Equivalents to these chelating agents and to the various substances can also be used.

The infusion soak solution can also contain a flavorant such as a fruit juice. The fruit juice can be from the same fruit as the fruit to be processed or it may be from a different fruit. Also a mixture of fruit juices and other flavorants can be used.

In the soaking of the fruit in this infusion soaking solution the fruit will exchange some of the content of its components with the components of the infusion soaking solution and will take up some of the components of the infusion soaking solution. For instance, a substantial amount of the glucose and fructose content of the fruit will be exchanged with the carbohydrate of the infusion soaking solution. The edible acid will be taken up by the fruit and will lower the pH of the fruit. The chelating agent will remove metal ions originally in the fruit, and metal ions from processing equipment that become attached to the fruit during fruit processing. The anti-microbiological agents also will be taken up by the fruit. Upon the fruit being dried, these substances become concentrated within the fruit. This concentration of the infusion soak solution components in the fruit serves to preserve the fruit and to give the fruit its extended shelf life. The heating of the fruit in the infusion solution serves to deactivate the enzymes in the fruit and to soften the fruit tissue. The softened fruit is easier to deaerate.

As has been noted above, the process of FIG. 1 sets forth the preferred method for producing the present dried fruits. In FIG. 1 the fruit is prepared by washing, peeling where necessary, removing the core of certain fruits and depitting other fruits. Further, the preparation of the fruit consists of cutting the fruit to a desired size. This can be a cutting into halves or quarters or slicing the fruit into smaller pieces. For instance, apricots will be cut in half. On the other hand, apples will be converted into slices of about 0.125 to 0.5 inch thick, and preferably about 0.375 inch thick. Some fruits will remain whole, such as grapes. After the fruit has been fully prepared, it is introduced into the infusion soak solution. The infusion soak solution is maintained at a temperature of about 60° F. to about 220° F., and preferably at a temperature of about 100° F. to 220° F. The fruits are maintained in this solution, preferably at atmospheric pressure, for a period of time of about 30 seconds to about 60 minutes, and preferably about 3 to 30 minutes. After being heated in this infusion soak solution the fruit then undergoes deaeration. The deaeration will consist of placing the fruit under a vacuum of about 1 inch to about 30 inches of mercury, and preferably about 20 to 30 inches of mercury. This deaeration is continued from about 1 second to about 2 hours and preferably from about 5 minutes to about 30 minutes. The objective of the deaeration step is to remove the free oxygen that is within the fruit. It is known that free oxygen assists in the discoloration of fruits. As the free oxygen is removed from the fruits it is replaced by the infusion soak solution. In this way the voids within the fruit will be filled with the infusion soak solution. After the deaeration step the fruits are brought back to atmospheric pressure, preferably using a non-free oxygen containing gas such as nitrogen, helium, hydrogen, carbon dioxide or the like. Essentially any non-free oxygen-containing gas can be utilized. This includes the inert gases. As noted above, free oxygen is non-chemically bound oxygen. In the next step the fruit is quickly cooled to about 50° F. to about 150° F. This is done in order to prevent non-enzymatic discoloration of the fruit due to an excessive exposure to heat. The fruit is then drained of the infusion soak solution and is dried. The fruit can be sun dried, vacuum dried, or can be dried in a commercial dryer. The drying in a dryer can be accomplished using forced air, using reduced oxygen conditions, or using non-free oxygen conditions such as utilizing nitrogen, carbon dioxide, helium, hydrogen, or essentially any other non-free oxygen gas or combinations of these gases. Further, drying can be conducted under reduced pressure. Regardless of the type of drying that is utilized, it is the objective to reduce the moisture content of the fruit to about 1% to about 70% moisture by weight, preferably about 10% to about 40% by weight moisture, and most preferably to about 15 to about 25% by weight. This dried fruit is then packaged. In packaging it is preferred that the package not contain oxygen, including air. In this regard, the packaging is conducted under a vacuum, or a non-free oxygen containing gas such as nitrogen, carbon dioxide, helium or hydrogen is utilized to remove oxygen from the package. The package containing the fruit and depleted of any oxygen is then sealed and put into storage.

In this process the infusion soaking solution from the draining step flows to an infusion soak solution tank and thereafter to enzyme treatment, decolorization and fortification with make-up infusion soak solution before being recycled to the infusion soak solution tank. The enzyme treatment consists of increasing the pH to about 5 to 6 and introducing pectic enzymes such as pectin methylesterases (PME) into the solution and holding the solution at 120° F. to 140° F. for 1 to 2 hours. The decolorization treatment consists of contacting the partially spent infusion soak solution with an adsorbent such as an activated carbon. After being decolorized the infusion soak solution is analyzed for the content of the substances remaining in the infusion soak solution. Where deficient in the amount of one or more of the infusion soak solution components, these substances are added to fortify the infusion soak solution prior to being recycled to reuse. In the alternative the used infusion solution can be used as a flavorant in other processes or products.

As has been noted above, there are variations that can be utilized in the deaeration of the fruit. As has been discussed thus far, the fruit is deaerated while in the infusion soak solution. However, in the alternative of FIG. 2, the fruit is drained of the infusion soak solution and is deaerated while not in any solution. In this deaeration the fruit would still contain a certain amount of the infusion soak solution that has not been removed during draining. As the air is removed from the fruit, this infusion soak solution that is within the fruit will be drawn to various parts of the fruit as the air is removed and coat the inner voids of the fruit. During deaeration the fruit cools due to water evaporation. The fruit is further cooled, if necessary, prior to the release of the vacuum.

Figure 3:
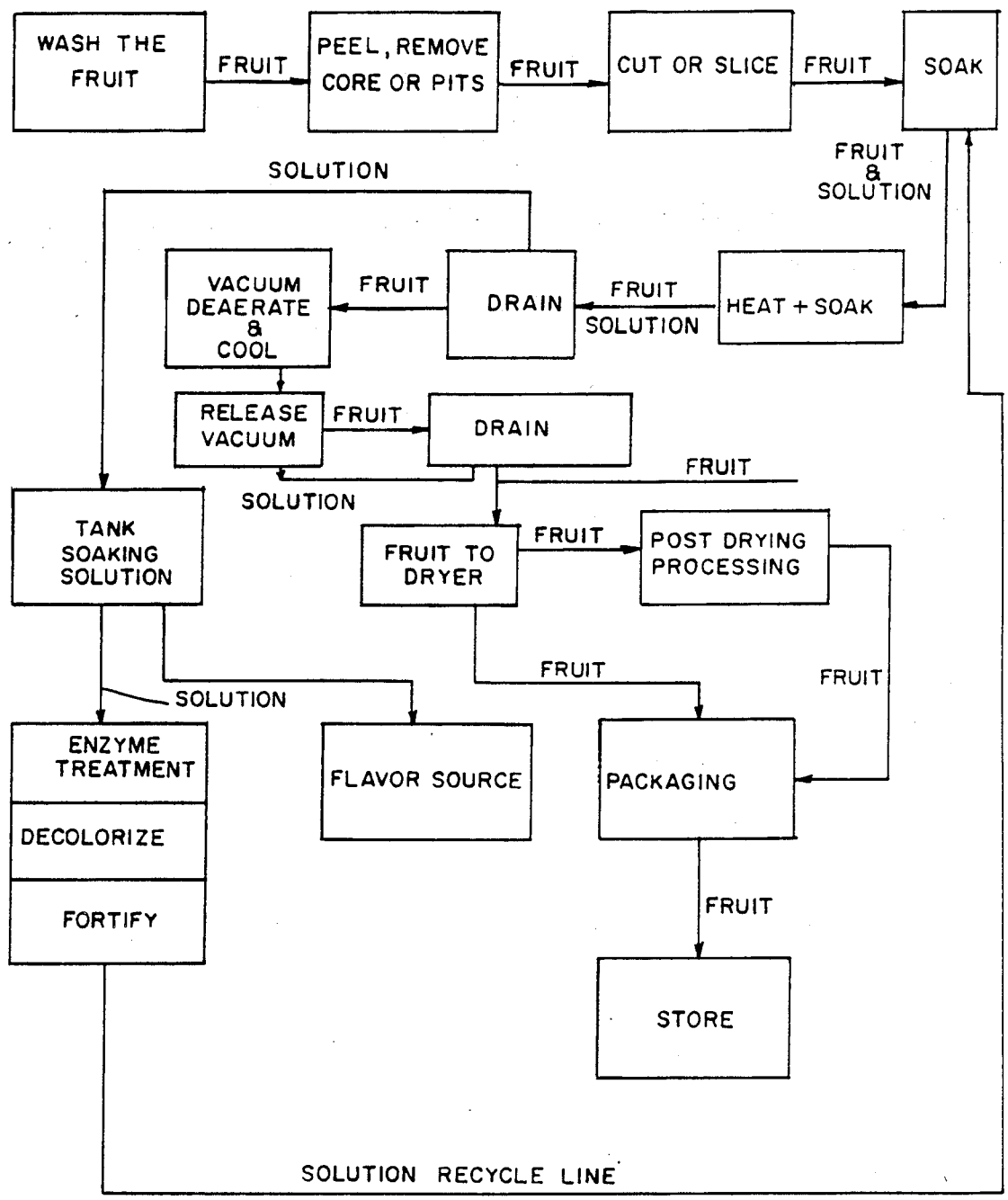
FIG. 3 is a schematic diagram of the present process wherein after heating, the infusion soak solution is drained from the fruit and the fruit is deaerated, the vacuum released with an additive liquid.

In the process modification that is set forth in FIG. 3, the fruit is drained after contact with the infusion soak solution. The fruit is then deaerated while not within any liquid solution. The fruit cools during this period of time. After deaeration the vacuum is released by adding a heated liquid. After the vacuum has been released the fruit is again drained, and after draining is sent to drying. The heated liquid which can contain an additive will be recycled to the heated liquid contact tank. Prior to being put into the additive solution contact tank, makeup substances can be added so that the heated liquid will be at a proper concentration. The heated liquid can be water and contain sweeteners and/or flavorants. Typical flavorants would be fruit juices. The temperature of the heated liquid will be from about 160° F. to 210° F. and preferably about 180° F. to 200° F.

Regardless of which processing scheme is used, there will be produced a dried fruit product which has an extended shelf life. Further this dried fruit product will not contain any sulfites.

The composition of the infusion soaking solution will vary depending on the particular fruit that is being treated. However, there is a range of contents for the components of the infusion soaking solution that should be utilized. Based on 100 parts of fruit there should be utilized about 50 to 150 parts by weight of water. The content of the carbohydrate having more than six carbon atoms should be in the range of from about 30 parts to about 100 parts by weight. The acid content should be in the range of from about 1 part to about 8 parts by weight. The anti-microbial agent should be in a content of about 0.05 parts to about 2 parts by weight. When a chelating agent is also utilized, the chelating agent should be in a range of about 0.2 to about 1 part by weight of the fruit content. As noted above, the exact contents of the ingredients of the infusion soaking solution will vary from batch to batch for the same fruit and will vary from fruit to fruit. The above ranges are given as those that are generally usable for fruits.

Figure 2:
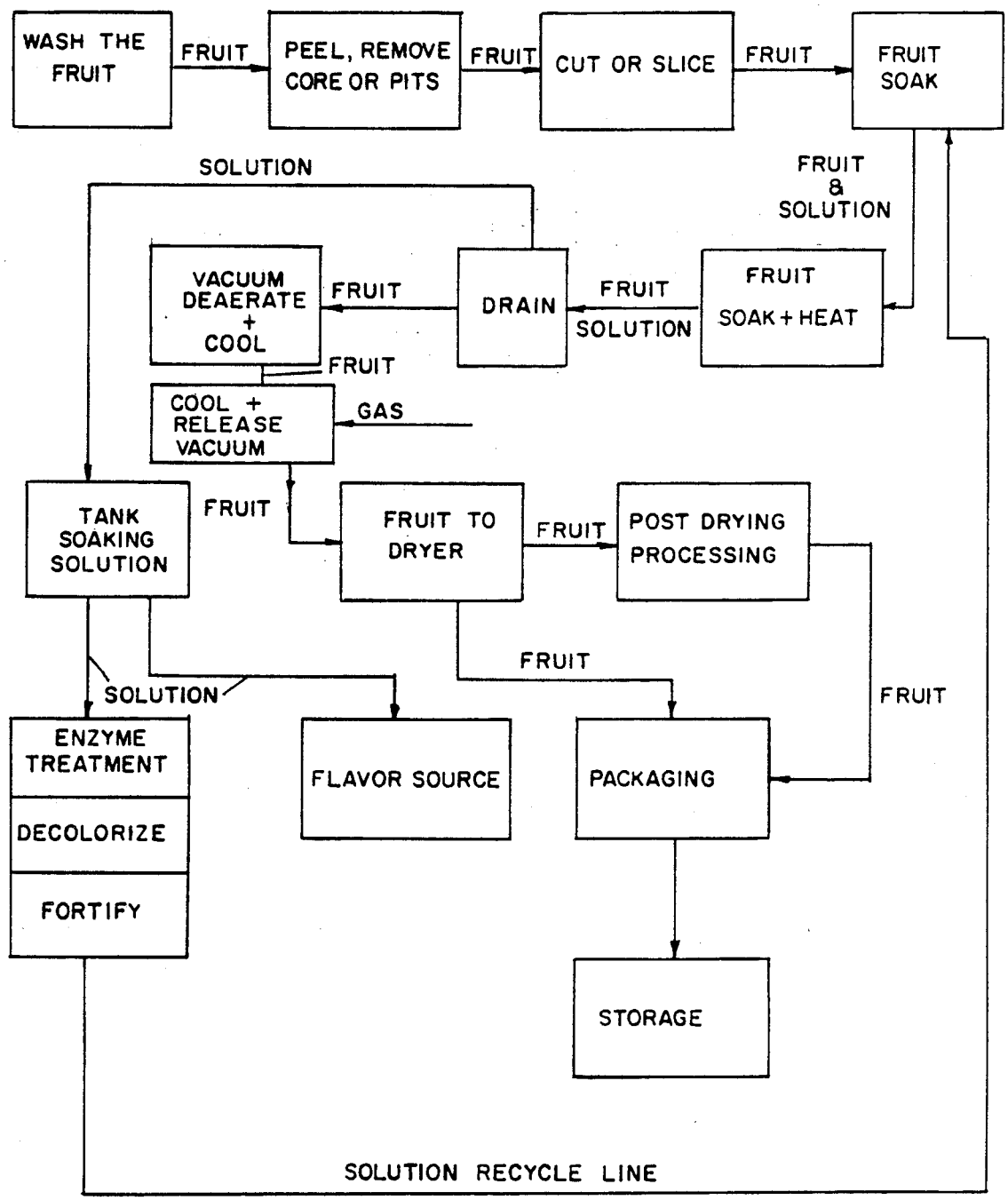
FIG. 2 is a schematic diagram of the present invention wherein the fruit is deaerated after the fruit has been removed from the infusion soak solution.

In the operation of the process it is advantageous to reuse the infusion soaking solution. This is shown in FIGS. 1 through 3. However, prior to the infusion soak solution being reused, it must undergo an enzyme treatment, a decolorization treatment and a fortification to bring the contents of the individual components back within specification. The ability to reuse this solution provides for a savings in treating substances and further significantly decreases the amount of solution that must be disposed of properly.

The fruits that can be treated and dried using the present processes include apples, peaches, pears, plums, apricots, nectarines and grapes. Essentially any fruit that can be dried can be preserved and dried using the present processes.

The present processes will be described in further detail with reference to the following examples.

EXAMPLE 1

Peaches were halved and depitted. 143 pounds of these peaches were then placed in an infusion soaking solution having the following composition:

| Water | 89.79 | pounds |
|---|---|---|
| Sugar | 95.33 | pounds |
| Citric Acid | 4.19 | pounds |
| Erythorbic acid | 1.13 | pounds |
| Potassium sorbate | 0.057 | pounds |
| Sodium benzoate | 0.057 | pounds |
| Sodium metahexaphosphate | 0.19 | pounds |

The peaches were placed for 15 minutes in this solution which is at a temperature of about 200° F. The peaches while remaining in the infusion soaking solution were deaerated by reducing the pressure to 29 inches of mercury for 10 minutes. After deaeration the peaches were cooled to 120° F. by reducing the temperature by indirect heat exchange. After cooling, the vacuum is slowly released. The peaches are then drained of the infusion soaking solution and the peach halves are dried in an air dryer by exposing the peaches to hot air at a temperature of about 140° F. for 16 hours. After drying to a moisture content of about 20% by weight moisture the dried peaches are packaged using an inert gas to displace any oxygen in the package. The final weight of the product is 34 pounds. The peaches did not undergo enzymatic or non-enzymatic browning and had a good shelf life.

EXAMPLE 2

Apricots were halved and depitted. 143 pounds of these apricots were then placed in an infusion soaking solution having the following composition:

| Water | 89.79 | pounds |
|---|---|---|
| Sugar | 95.33 | pounds |
| Citric Acid | 4.19 | pounds |
| Erythorbic Acid | 1.12 | pounds |
| EDTA* | 0.55 | pounds |
| Potassium sorbate | 0.057 | pounds |
| Sodium benzoate | 0.057 | pounds |

(*EDTA is disodium ethylenediaminetetraacetic acid)

The apricots were placed for 15 minutes in this solution which is at a temperature of 200° F. The apricots halves while remaining in the infusion soaking solution were deaerated by reducing the pressure to 29 inches of mercury for 10 minutes. After deaeration the apricot halves were cooled to 120° F. by reducing the temperature by indirect heat exchange. After cooling the vacuum is slowly released. The apricots are drained of the infusion soaking solution and the apricot halves are dried in an air dryer by exposing the apricot halves at a temperature of about 140° F. for 16 hours. After drying to a moisture content of about 20% by weight moisture the dried apricot halves are packaged using an inert gas to displace any oxygen in the package. The final weight of the product is 34 pounds. The apricots did not undergo enzymatic or non-enzymatic browning and had a good shelf life.

EXAMPLE 3

Apples were peeled, decored and sliced to about ⅜ inch slices. 120 pounds of these apple slices were then placed in an infusion soaking solution having the following composition:

| Water | 141.86 | pounds |
|---|---|---|
| Sugar | 78.75 | pounds |
| Citric Acid | 2.70 | pounds |
| Erythorbic acid | 1.33 | pounds |
| Potassium sorbate | 0.068 | pounds |
| Sodium benzoate | 0.068 | pounds |
| Sodium metahexaphosphate | 0.225 | pounds |

The apple slices were placed in the soaking solution at ambient temperature and while remaining in the soaking solution were dearated by reducing the pressure to 29 inches of mercury for 10 minutes. After deaeration the apple slices are at a temperature of about 90° F. The vacuum is then slowly released. After the apple slices are drained of the infusion soak solution the apple slices are dried in an air dryer by exposing the apple slices to a temperature of about 130° F. for 10 hours. After drying to a moisture content of about 20% by weight moisture the dried fruit is packaged using an inert gas to displace any oxygen in the package. The final weight of the product is 30 pounds. The apple slices did not undergo enzymatic or non-enzymatic browning and had a good shelf life.

EXAMPLE 4

Pears were peeled, cored and halved. 225 pounds of these pear halves were then placed in a soaking solution having the following composition:

| Water | 141.86 | pounds |
|---|---|---|
| Sugar | 78.75 | pounds |
| Citric acid | 2.70 | pounds |
| Erythorbic acid | 1.33 | pounds |
| Potassium sorbate | 0.068 | pounds |
| Sodium benzoate | 0.068 | pounds |
| Sodium metahexaphosphate | 0.225 | pounds |

The pear halves were placed 15 minutes in this solution which is at a temperature of 200° F. The pear halves while remaining in the infusion soaking solution were dearated by reducing the pressure to 29 inches of mercury for 10 minutes. After deaeration the pear halves were cooled to 120° F. by reducing the temperature by indirect heat exchange. After cooling, the vacuum is slowly released. The pear halves are then drained of the infusion soak solution and are air dried in an air dryer at a temperature of about 140° F. for 12 hours. After drying to a moisture content of about 20% by weight moisture the dried fruit is packaged using an inert gas to displace any oxygen in the package. The final weight of the product is 53 pounds. The pears did not undergo enzymatic or non-enzymatic browning and had a good shelf life.

I claim:

1. A process for preparing dried fruits comprising:
   (a) preparing the fruit;
   (b) heating the prepared fruit in an aqueous infusion soak solution at a temperature of about 60° F. to 220° F. for from about 0.5 to 60 minutes to deactivate enzymes and to soften the fruit;
   (c) placing the heated fruit under a vacuum of about 1 inch to 30 inches of mercury for about 1 second to 2 hours to deaerate the fruit;
   (d) releasing the vacuum on the deaerated fruit and;
   (e) drying the fruit said dried fruit being prepared without the use of a sulfiting treatment step.

2. A process for preparing dried fruits as in claim 1 wherein the fruit is deaerated in the presence of the infusion soak solution and thereafter cooled to 20° F. to 150° F.

3. A process for preparing dried fruits as in claim 1 wherein the fruit is drained of the infusion soak solution prior to being placed under a vacuum and deaerated.

4. A process for preparing dried fruits as in claim 3 wherein the deaerated fruit is contacted with a further aqueous solution to thereby release the vacuum on said fruit.

5. A process for preparing dried fruits as in any one of claims 1, 2, 3 or 4 wherein the liquid drained from said fruit is treated and recycled as make-up infusion soak solution.

6. A process for preparing dried fruits as in any one of claims 1, 2, 3 or 4 wherein said fruit is prepared by peeling and reducing the fruit to smaller pieces.

7. A process for preparing dried fruits as in claim 5 wherein said fruit is cored.

8. A process for preparing dried fruits as in claim 5 wherein said fruit is depitted.

9. A process for preparing dried fruits as in any one of claims 2, 3 or 4 wherein said aqueous infusion soak solution contains a carbohydrate having more than six carbon atoms, an edible acid, and an edible anti-microbiological agent.

10. A process for preparing dried fruits as in claim 9 wherein said aqueous infusion soak solution contains an edible chelating agent.

11. A process for preparing dried fruits as in claim 9 wherein said carbohydrate is selected from the group consisting of sucrose, maltose and lactose.

12. A process for preparing a dried fruit as in claim 9 wherein said acid is selected from the group consisting of citric acid, malic acid, fumaric acid, ascorbic acid, erythorbic acid, phosphoric acid, and salts thereof.

13. A process for preparing a dried fruit as in claim 10 wherein said chelating agent is selected from the group consisting of ethylenediaminetetraacetic acid, citric acid, phosphates, phosphoric acid and salts thereof.

14. A process for preparing a dried fruit as in claim 9 wherein said anti-microbiological agent is selected from the group consisting of benzoic acid, sorbic acid, propionic acid and salts thereof.

15. A process for preparing dried fruits as in any one of claims 1, 2, 3 or 4 wherein said fruits are selected from the group consisting of peaches, apricots, apples, pears, plums, grapes, nectarines and mixtures thereof.

16. A process for preparing dried fruits as in any one of claims 2, 3 or 4 wherein said fruits are dried under reduced pressure.

17. A process for preparing dried fruits as in any one of claim 2, 3 or 4 wherein said fruits are air dried.

18. A process for preparing dried fruits as in any one of claims 2, 3 or 4 wherein said fruits are dried at a temperature of about 50° F. to 220° F.

* * * * *